(12) United States Patent
Unagami et al.

(10) Patent No.: US 9,729,332 B2
(45) Date of Patent: Aug. 8, 2017

(54) DEVICE AUTHENTICATION SYSTEM AND AUTHENTICATION METHOD

(71) Applicant: Panasonic Intellectual Property Management Co., Ltd., Osaka (JP)

(72) Inventors: Yuji Unagami, Osaka (JP); Motoji Ohmori, Osaka (JP); Natsume Matsuzaki, Osaka (JP); Hideki Matsushima, Osaka (JP); Tomoyuki Haga, Nara (JP); Manabu Maeda, Osaka (JP); Yoshihiro Ujiie, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/726,633

(22) Filed: Jun. 1, 2015

(65) Prior Publication Data
US 2015/0295721 A1  Oct. 15, 2015

Related U.S. Application Data

(63) Continuation of application No. PCT/JP2014/003791, filed on Jul. 17, 2014.
(Continued)

(51) Int. Cl.
*H04L 29/06* (2006.01)
*H04L 9/32* (2006.01)
(Continued)

(52) U.S. Cl.
CPC .......... *H04L 9/3268* (2013.01); *G06F 21/33* (2013.01); *G06F 21/44* (2013.01); *H04L 63/0823* (2013.01)

(58) Field of Classification Search
CPC ................................................. H04L 9/3268
See application file for complete search history.

(56) References Cited

U.S. PATENT DOCUMENTS

| | | | | |
|---|---|---|---|---|
| 6,351,812 B1 * | 2/2002 | Datar | ...................... | G06F 21/33 |
| | | | | 713/164 |
| 7,047,404 B1 * | 5/2006 | Doonan | .................. | G06F 21/64 |
| | | | | 380/30 |

(Continued)

FOREIGN PATENT DOCUMENTS

| KR | 20070109797 A | * 11/2007 | ............. G06F 21/10 |
|---|---|---|---|
| WO | 2013/179534 | 12/2013 | |

OTHER PUBLICATIONS

International Search Report of PCT application No. PCT/JP2014/003791 dated Oct. 21, 2014.
(Continued)

*Primary Examiner* — Shawnchoy Rahman
(74) *Attorney, Agent, or Firm* — Greenblum & Bernstein, P.L.C.

(57) ABSTRACT

An authentication system according to the present disclosure includes a first controller connected to a first server via a first network, a second controller connected to a second server via a second network, and a device. The device compares a next issue date described in a first certificate revocation list acquired from the first controller and an issue date described in a second certificate revocation list acquired from the second controller thereby determining whether the first controller is invalid or not.

11 Claims, 22 Drawing Sheets

Related U.S. Application Data

(60) Provisional application No. 61/913,624, filed on Dec. 9, 2013.

(51) Int. Cl.
*G06F 21/44* (2013.01)
*G06F 21/33* (2013.01)

(56) References Cited

U.S. PATENT DOCUMENTS

| | | | |
|---|---|---|---|
| 2002/0007346 A1* | 1/2002 | Qiu | G06F 21/33 705/50 |
| 2005/0210241 A1* | 9/2005 | Lee | G06F 21/10 713/158 |
| 2008/0052510 A1* | 2/2008 | Kim | H04L 9/3268 713/158 |
| 2009/0113206 A1* | 4/2009 | Shen-Orr | H04L 9/3268 713/158 |
| 2010/0031031 A1* | 2/2010 | Tian | H04L 63/06 713/156 |
| 2014/0129829 A1 | 5/2014 | Unagami et al. | |
| 2014/0237582 A1* | 8/2014 | Niemela | H04L 63/0823 726/10 |
| 2016/0065377 A1* | 3/2016 | Ichijo | H04W 12/12 713/175 |
| 2016/0072630 A1* | 3/2016 | Ujiie | G06F 21/33 713/158 |
| 2016/0277195 A1* | 9/2016 | Maeda | H04L 9/3268 |
| 2017/0012785 A1* | 1/2017 | Haga | G06F 21/33 |

OTHER PUBLICATIONS

"Wi-Fi Certified Wi-Fi Protected Setup" Wi-Fi Alliance, Dec. 2010.
Atsuko Miyaji et al. "Information Security" Ohm-sha pp. 140-147, Oct. 25, 2003.
"Suite B Implementer's Guide to FIPS 186-3 (ECDSA)" Feb. 3, 2010.
Elaine Barker et al., "Recommendation for Pair-Wise Key Establishment Schemes Using Discrete Logarithm Cryptography" NIST Special Publication 800-56A Revision 2.
D. Forsberg et al., "Protocol for Carrying Authentication for Network Access (PANA)", RFC5191, May 2008.
The Extended European Search Report dated Nov. 2, 2016 for European Patent Application No. 14864992.4.

* cited by examiner

FIG. 3

| DEVICE ID | CERTIFICATE ID |
|---|---|
| DEVICE ID-1 | CERTIFICATE ID(M1) |
| DEVICE ID-2 | CERTIFICATE ID(M2) |
| DEVICE ID-3 | CERTIFICATE ID(M3) |
| ... | ... |

FIG. 7

| CONTROLLER ID | CERTIFICATE ID |
|---|---|
| CONTROLLER ID-1 | CERTIFICATE ID(C1) |
| CONTROLLER ID-2 | CERTIFICATE ID(C2) |
| ... | ... |

FIG. 9

| CONTROLLER ID | CERTIFICATE ID OF CONTROLLER | DEVICE ID | CERTIFICATE ID OF DEVICE | HISTORY INFORMATION |
|---|---|---|---|---|
| CONTROLLER ID-1 | CERTIFICATE ID(C1) | DEVICE ID-1 | CERTIFICATE ID(M1) | HISTORY INFORMATION-1 |
| | | DEVICE ID-2 | CERTIFICATE ID(M2) | HISTORY INFORMATION-2 |
| | | DEVICE ID-3 | CERTIFICATE ID(M3) | HISTORY INFORMATION-3 |
| ... | | ... | | |

FIG. 20

| CONTROLLER ID | CERTIFICATE ID | SHARED KEY |
|---|---|---|
| CONTROLLER ID-1 | CERTIFICATE ID(C1) | 96385··· |
| CONTROLLER ID-2 | CERTIFICATE ID(C2) | 19283··· |
| ··· | ··· | |

FIG. 21

| DEVICE ID | CERTIFICATE ID | SHARED KEY |
|---|---|---|
| DEVICE ID-1 | CERTIFICATE ID(M1) | 01234··· |
| DEVICE ID-2 | CERTIFICATE ID(M2) | 98765··· |
| DEVICE ID-3 | CERTIFICATE ID(M3) | 19283··· |
| ··· | ··· | ··· |

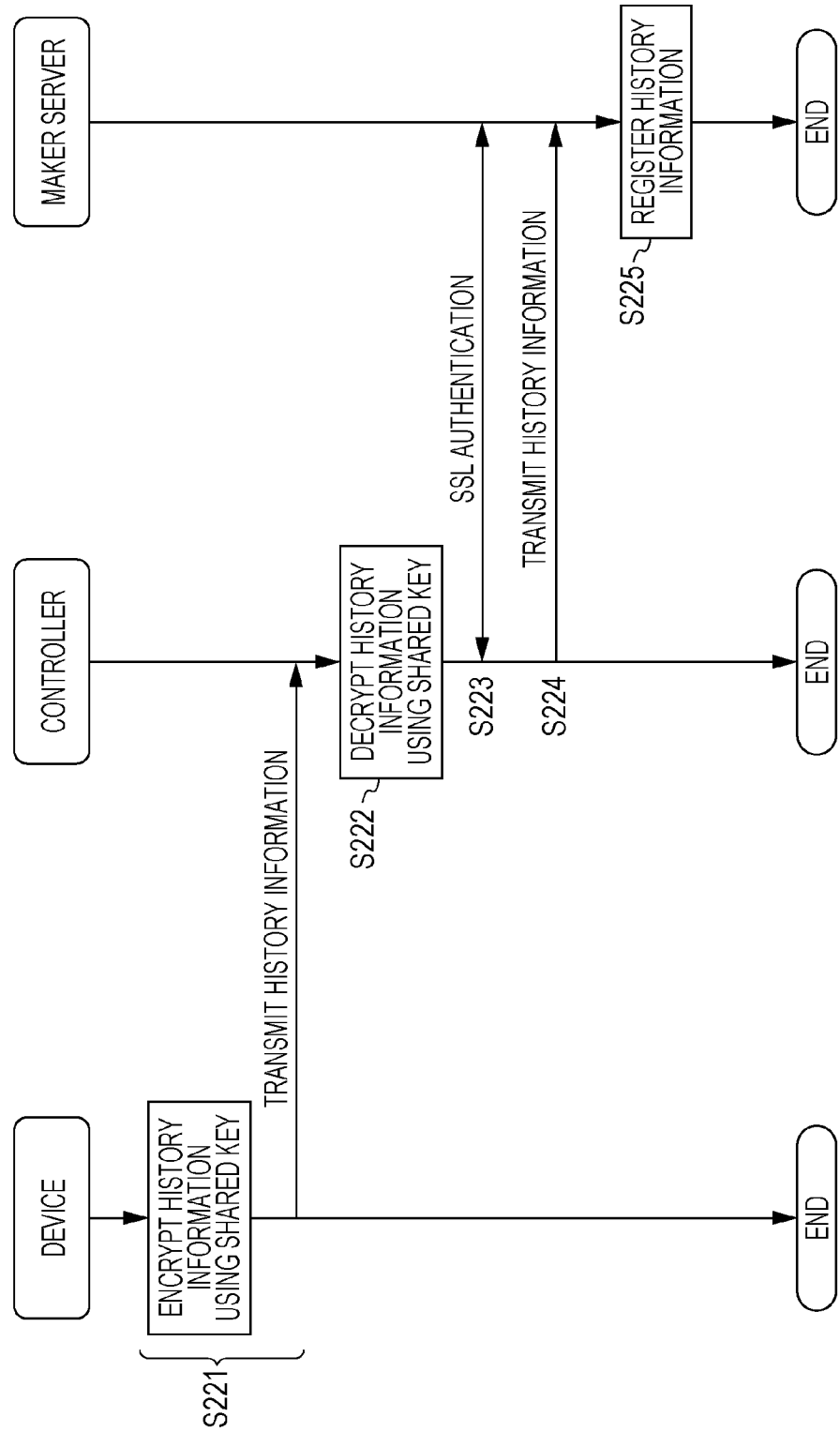

DEVICE AUTHENTICATION SYSTEM AND AUTHENTICATION METHOD

BACKGROUND

1. Technical Field

The present disclosure relates to an authentication system capable of securely connecting a device to a controller.

2. Description of the Related Art

In recent years, it has been expected to provide a service such that a household electrical appliance or an AV device in a home is connected to a network, and the service is provided based on various kinds of history information collected in a cloud via the network. In this service, a controller is installed in a home, and history information is transmitted from a household electrical appliance to a maker server via the controller. The connection between the controller and the household electrical appliance is set in a secure manner such that communication in the home is controlled so as to prevent leakage of information via wireless communication and prevent a domestic network from being connected by spoofing.

For the above, the Wi-Fi alliance has established standards called Wi-Fi Protected Setup that allow it to easily make a connection between devices (Wi-Fi Alliance, "Wi-Fi CERTIFIED Wi-Fi Protected Setup: Easing the User Experience for Home and Small Office Wi-Fi Networks (2010)" (uploaded December 2010 at URL: http://www.wi-fi.org/ja/file/wi-fi-certified-wi-fi-protected-setup%E2%84%A2-easing-the-user-experience-for-home-and-small-office-wi, searched Jun. 24, 2014). However, in wireless Wi-Fi connection, device interconnectivity is guaranteed only between a household electrical appliance and a device at an access point corresponding to a controller, but authentication is not performed as to whether a connected device is a valid device.

Conventionally, to authenticate validity of a device, it is known to use a public key infrastructure (PKI) (Atsuko Miyaji, Hiroaki Kikuchi, "IT Text Information Security", Oct., 2003). In the authentication based on the PKI, validity of a device is guaranteed by authenticating that an entity (a household electrical appliance or a controller) has a secret key and a public key certificate issued by a certificate authority. In a case where leakage or the like of a secret key occurs, it is needed to revoke a public key certificate thereof to prevent an unauthorized use of the public key certificate. A typical means of revoking the public key certificate is to use a certificate revocation list (CRL) which is a list of revoked certificates (Atsuko Miyaji, Hiroaki Kikuchi, "IT Text Information Security", Oct., 2003). The CRL is a list of revoked public key certificates in which IDs or the like of revoked public key certificates are described. The CRL is attached with a signature of the certificate authority that issued the public key certificates and is distributed by the certificate authority. An entity such as a household electrical appliance or a controller checks whether the CRL includes a public key certificate of another entity to be connected. Therefore, the CRL used is needed to be the latest one.

D. Forsberg, et al., RFC5191, "Protocol for Carrying Authentication for Network Access (PANA)" (uploaded May, 2008 at URL: http://www.rfc-editor.org/rfc/pdfrfc/rfc5191.txt.pdf by Internet Engineering Task Force, searched Jun. 24, 2014) is an example of related art.

SUMMARY

One non-limiting and exemplary embodiment provides a technique that allows it to provide a further improvement in the conventional authentication system described above.

In one general aspect, the techniques disclosed here feature that an authentication system of performing household device authentication includes a first controller connected to a first server via a first network, a second controller connected to a second server via a second network, and a device connected to the first controller and the second controller, the authentication system being capable of performing authentication between the device and the first controller or between the device and the second controller, the device including an authenticator that acquires a first certificate revocation list from the first controller and acquires a second certificate revocation list from the second controller, wherein the first certificate revocation list and the second certificate revocation list each are a revocation list associated with a certificate of the first controller, a certificate of the second controller, and a certificate of the device, and wherein the authenticator acquires first time information indicating a next issue date of the first certificate revocation list, acquires second time information indicating an issue date of the second certificate revocation list, and compares the acquired first time information and the second time information thereby determining whether the first controller is invalid or not.

According to the present disclosure, it is possible to achieve a further improvement in the authentication system.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of a connected device management table of a controller according to the first embodiment;

FIG. 7 is a diagram illustrating an example of a connected controller management table of a device according to the first embodiment;

FIG. 9 is a diagram illustrating an example of a device information management table of a maker server according to the first embodiment;

FIG. 20 is a diagram illustrating an example of a connected controller management table of a device according to the second embodiment;

FIG. 21 is a diagram illustrating an example of a connected device management table of a controller according to the second embodiment; and FIG. 22 is a diagram illustrating a sequence of processing of transmitting device history information according to the second embodiment.

DETAILED DESCRIPTION

Figure 1:
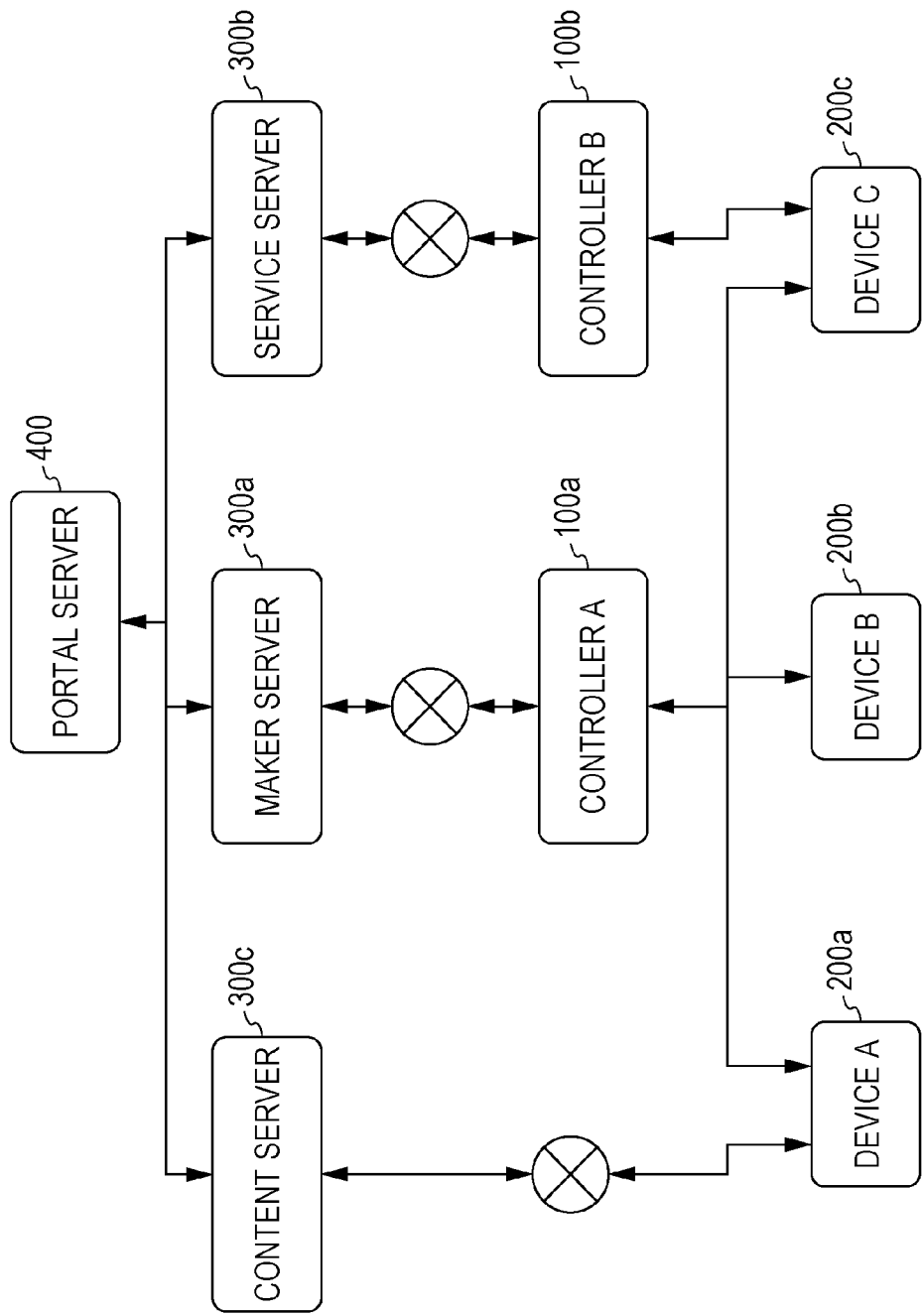
FIG. 1 is a diagram illustrating an overall configuration of an authentication system according to a first embodiment.

Underlying Knowledge Forming Basis of the Present Disclosure

In a case where a household electrical appliance is connected to only one controller, the household electrical appliance acquires the CRL via the controller. In this case, if the controller is an invalid device, then even when the public key certificate is described in the CRL, the household electrical appliance authenticates the controller as a valid device unless the controller sends, to the household electrical appliance, the CRL in which the public key certificate of the controller is described.

Based on the consideration and analysis described above, the following aspects of the present disclosure have been achieved.

According to an aspect of the present disclosure, an authentication system of performing household device authentication includes a first controller connected to a first server via a first network, a second controller connected to a second server via a second network, and a device connected to the first controller and the second controller, the authentication system being capable of performing authentication between the device and the first controller or between the device and the second controller, the device including an authenticator that acquires a first certificate revocation list from the first controller and acquires a second certificate revocation list from the second controller, wherein the first certificate revocation list and the second certificate revocation list each are a revocation list associated with a certificate of the first controller, a certificate of the second controller, and a certificate of the device, and wherein the authenticator acquires first time information indicating the next issue date of the first certificate revocation list, acquires second time information indicating the issue date of the second certificate revocation list, and compares the acquired first time information and the second time information thereby determining whether the first controller is invalid or not.

In a case in which a device is connected to only one controller, if the controller is an invalid controller, it is impossible for the device to update the CRL. However, in the authentication system disclosed here, the device is allowed to receive a CRL via a plurality of networks and is allowed to update the CRL. By making it possible of updating the CRL, it becomes possible to prevent a connection to an invalid controller, and it becomes possible to achieve a secure connection between a device and a valid controller.

Furthermore, in the authentication system according to the aspect of the present disclosure, in a case where the first time information is earlier than the second time information, the authenticator may determine that the first controller is invalid.

Furthermore, in the authentication system according to the aspect of the present disclosure, in a case where the authenticator determines that the first controller is invalid, the authenticator may disable the connection with the first controller.

Furthermore, in the authentication system according to the aspect of the present disclosure, in a case where the authenticator determines that the first controller is invalid, the authenticator may notify the second controller that the first controller is invalid.

Furthermore, in the authentication system according to the aspect of the present disclosure, one of the first server and the second server may be a content server that provides a content.

Furthermore, in the authentication system according to the aspect of the present disclosure, the other one of the first server and the second server may be a service server of an electric power company.

The authentication systems according to embodiments of the present disclosure are described below with reference to drawings. Note that each embodiment described below is for illustrating a preferable specific example of the present disclosure. That is, in the following embodiments of the present disclosure, values, shapes, materials, constituent elements, locations o the constituent elements and manners of connecting the constituent elements, steps, the order of steps, and the like are described by way of example but not limitation. The present disclosure is defined by descriptions of claims. Among constituent elements described in the following embodiments, those constituent elements that are not described in independent claims indicating highest-level concepts of the present disclosure are not necessarily needed in achieving the object of the present disclosure, but such constituent elements are used to achieve more preferable aspects.

First Embodiment

1. System Configuration

An authentication system 10 according to an embodiment of the present disclosure is described below with reference to drawings.

1.1 Overall Configuration of Authentication System 10

FIG. 1 is a diagram illustrating an overall configuration of an authentication system 10 according to the present disclosure. The authentication system 10 includes a controller 100, a device 200, a server 300, and a portal server 400. Controllers 100a to 100b are devices having a function of controlling devices. The controllers 100a to 100b also have a function of connecting to a server and transmitting household electrical appliance history information to the server, and further have a function of receiving a control request from the server and controlling the household electrical appliance. Devices 200a to 200c are household electrical appliances or household facility devices such as a television set, a recorder, an air conditioner, a refrigerator, a battery, or the like that collect device history information. Servers 300a to 300c are content servers that provide contents, maker servers that produce household electrical appliances, or service servers of service providers that provide service. In a specific example, history information of a device in a home is transmitted to a controller, and the controller transmits the history information of the device to a maker server. In a case where a service server is that of an electric power company, the service server at the electric power company is connected to a controller via a smart meter (not illustrated) in a home. The controller controls the device in the home based on power information from the electric power company so as to suppress power consumption in the home.

1.2 Configuration of Controller 100

Figure 2:
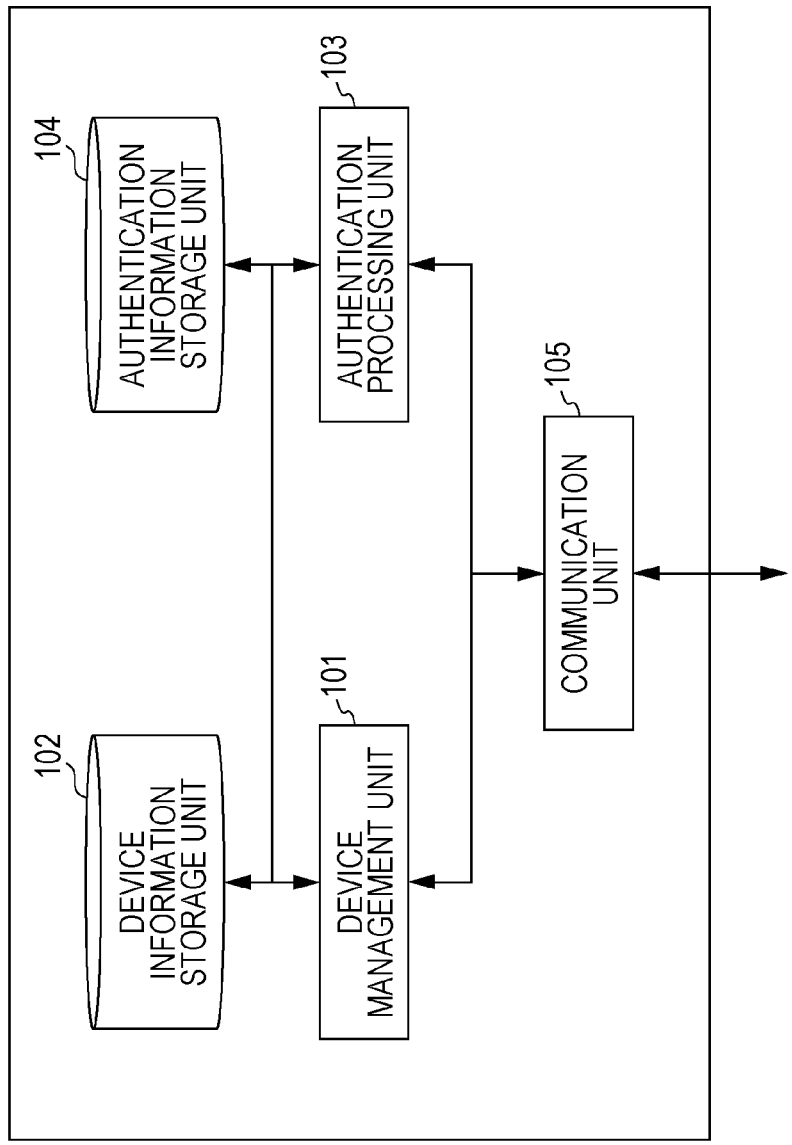
FIG. 2 is a diagram illustrating a configuration of a controller according to the first embodiment.

FIG. 2 is a diagram illustrating a configuration of the controller 100a. The controller 100a includes a device management unit 101, a device information storage unit 102, an authentication processing unit 103, an authentication information storage unit 104, and a communication unit 105. The controller 100b also has a similar configuration.

The device management unit 101 manages devices connected to the controller. In a case where a connection request is issued from a device, the device management unit 101 transmits a public key certificate received from the device to the authentication processing unit 103 and requests an authentication process. The device management unit 101 receives an authentication result from the authentication processing unit 103. When the authentication is successful, the device management unit 101 registers a device ID and a certificate ID in the connected device management table stored in the device information storage unit 102.

The device information storage unit 102 manages information of devices connected to the controller. FIG. 3 is a diagram illustrating an example of a device information management table stored in the device information storage unit 102. The device information management table records device IDs and certificate IDs of public key certificates possessed by the devices.

The authentication processing unit 103 performs an authentication process associated with a device. If the authentication processing unit 103 receives an authentication request together with a public key certificate of a device from the device management unit 101, the authentication processing unit 103 acquires a CRL recorded in the authentication information storage unit 104 and checks whether the certificate ID of the public key certificate of the device is described in the CRL. Furthermore, the authentication processing unit 103 verifies a signature of the public key certificate based on a public key (not shown) of a portal server of a certificate authority. Furthermore, the authentication processing unit 103 generates a random number and transmits the random number to the device. The authentication processing unit 103 verifies a signature of the random number received from the device. In a case where any verification fails, the authentication processing unit 103 determines that the device is an invalid device.

Figure 4:
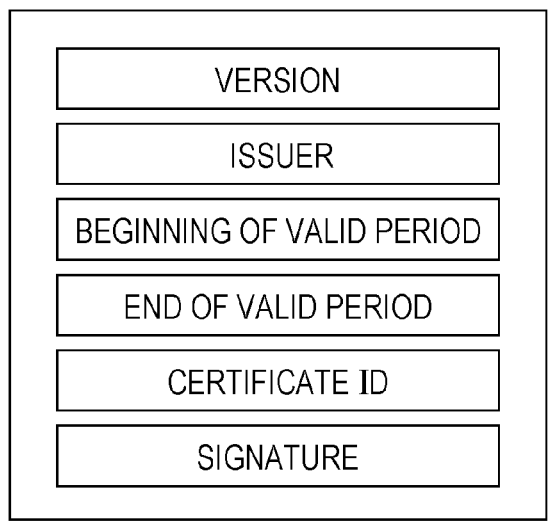
FIG. 4 is a diagram illustrating an example of a public key certificate according to the first embodiment.
Figure 5:
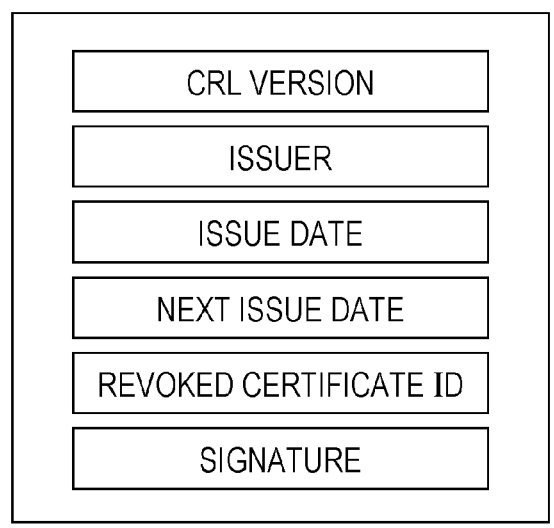
FIG. 5 is a diagram illustrating an example of a CRL according to the first embodiment.

The authentication information storage unit 104 has a key pair of a secret key and a public key certificate, and a CRL. The secret key, the public key certificate, and the CRL are embedded in the authentication information storage unit 104 when shipment is performed. FIG. 4 is a diagram illustrating an example of a configuration of a public key certificate. The public key certificate includes a version, an issuer, a start and an end of a valid period, a certificate ID, and a signature of a portal server of a certificate authority. FIG. 5 a diagram illustrating an example of a configuration of a CRL. The CRL includes a CRL version, an issuer, an issue date, a next issue date, a revoked certificate ID, and a signature of a portal server of a certificate authority. Note that the certificate ID is not limited to a single certificate ID, but there may be a plurality of certificate IDs.

The communication unit 105 communicates with the device 200, the maker server 300a, or the service server 300b. In the communication with the servers, SSL (Secure Socket Layer) communication is performed. A certificate necessary in the SSL communication is recorded by the communication unit 105.

1.3 Configuration of Device 200

Figure 6:
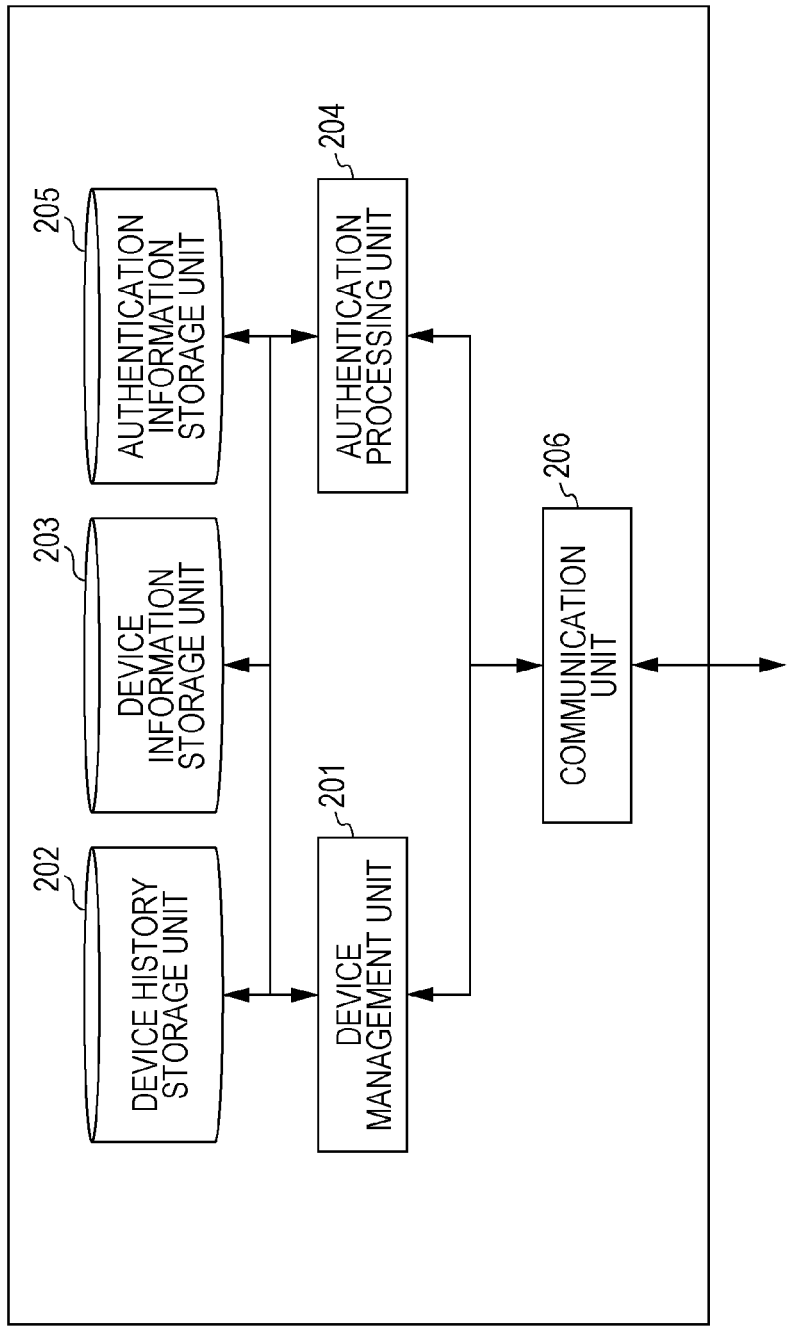
FIG. 6 is a diagram illustrating a configuration of a device according to the first embodiment.

FIG. 6 is a diagram illustrating a configuration of the device 200. The device 200 includes a device management unit 201, a device history storage unit 202, a device information storage unit 203, an authentication processing unit 204, an authentication information storage unit 205, and a communication unit 206.

At the start, the device management unit 201 transmits a connection request to the controller 100. In a case where a connection to the content server 300c is made without making a connection to the controller, the communication unit 206 performs SSL communication in communication with the content server 300c. When the device management unit 201 receives a public key certificate from the controller, the device management unit 201 transmits an authentication request to the authentication processing unit 204. The device management unit 201 receives an authentication result from the authentication processing unit 204. In a case where the authentication is successful, the device management unit 201 registers a controller ID and a certificate ID in the connected controller management table stored in the device information storage unit 203. The device management unit 201 transmits device history recorded in the device history storage unit 202, periodically or non-periodically, to the server via the controller. Note that in a case where a direct connection with the content server is employed, the device history is transmitted to the server not via the controller.

The device history storage unit 202 acquires operation history of the device and records it.

The device information storage unit 203 manages information of the controller 100 connected to the device. FIG. 7 is a diagram illustrating an example of a connected controller management table stored in the device information storage unit 203. The connected controller management table records a controller ID, and a certificate ID of a public key certificate possessed by the controller.

The authentication processing unit 204 performs an authentication process associated with the controller. When the authentication processing unit 204 receives an authentication request together with a public key certificate from the device management unit 201, the authentication processing unit 204 acquires a CRL recorded in the authentication information storage unit 204 and checks whether the certificate ID of the public key certificate of the controller is described in the CRL. Furthermore, the authentication processing unit 204 verifies a signature of the public key certificate based on a public key (not shown) of a portal server of a certificate authority. Furthermore, the authentication processing unit 204 generates a random number and transmits the random number to the controller. The authentication processing unit 204 verifies a signature of the random number received from the controller. In a case where any verification fails, the authentication processing unit 204 determines that the controller is an invalid device.

The authentication information storage unit 205 has a key pair of a secret key and a public key certificate, and a CRL. The key pair of the secret key and the public key certificate and the CRL are embedded in the authentication information storage unit 205 when shipment is performed. The public key certificate and the CRL are the same in configuration as the public key certificate and the CRL possessed by the controller, and thus a further description thereof is omitted.

The communication unit 206 communicates with the controller 100 and the content server 300. In the communication with the content server, the communication unit 206 performs SSL (Secure Socket Layer) communication. A certificate necessary in the SSL communication is recorded by the communication unit 206.

1.4 Configuration of the Maker Server 300a

Figure 8:
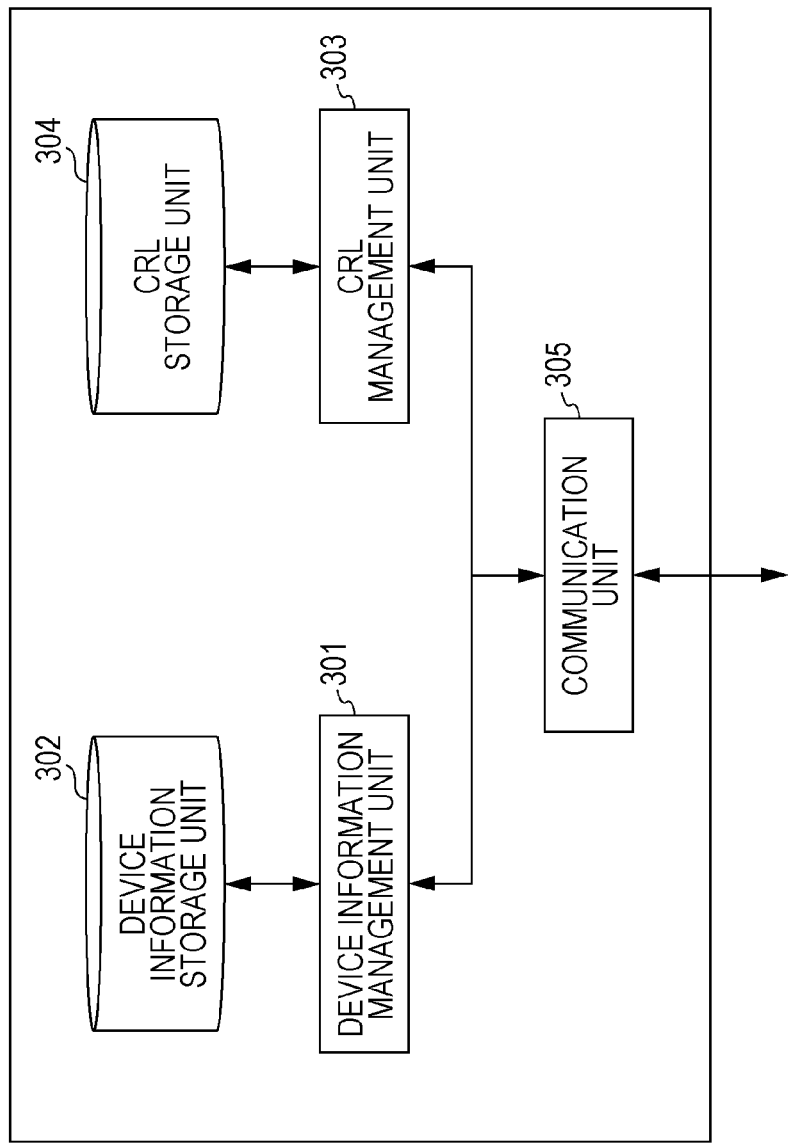
FIG. 8 is a diagram illustrating a configuration of a maker server according to the first embodiment.

FIG. 8 is a diagram illustrating a configuration of the maker server 300a. The maker server 300a includes a device information management unit 301, a device information storage unit 302, a CRL management unit 303, a CRL storage unit 304, and a communication unit 305. The service server 300b also has a similar configuration.

The device information management unit 301 controls the device information storage unit 302 to mange linkage between controllers and devices, IDs and certificate IDs of connected controllers and devices, and device history. In a case where the device information management unit 301 detects an invalid device or an invalid controller, the device information management unit 301 sends to the portal server a notification of the certificate ID of the device or the controller, and requests the portal server to issue a CRL. In a case where the CRL is updated, the device information management unit 301 transmits the CRL to the CRL management unit 303.

The device information storage unit 302 records IDs of controllers and devices, IDs of certificates, and history of devices. FIG. 9 is a diagram illustrating an example of a device information management table. In this example, the table indicates that a controller having an ID of controller ID-1 is connected to devices having devices ID-1 to ID-3. Furthermore, certificate ID of the controller and certificate IDs of the devices are also recorded. It is indicated that history information of the device ID-1 is recorded in history information 1.

The CRL management unit 303 controls the CRL storage unit 304 such that when a CRL is received from the device information management unit 301, the CRL management unit 303 updates the CRL stored in the CRL storage unit 304.

The CRL storage unit 304 records the CRL.

The communication unit 305 communicates with the controller 100a and the portal server 400. In the communication with the controller 100a or the portal server 400, SSL communication is performed. A certificate necessary in the SSL communication is recorded by the communication unit 305.

The configuration of the content server 300c is different from the configuration of the maker server 300a. To connect a device not via a controller, SSL authentication is performed between the content server 300c and the device. Note that the device information management table of the device information storage unit 302 is a device information management table in which no information of the controller is described.

1.5 Configuration of Portal Server 400

Figure 10:
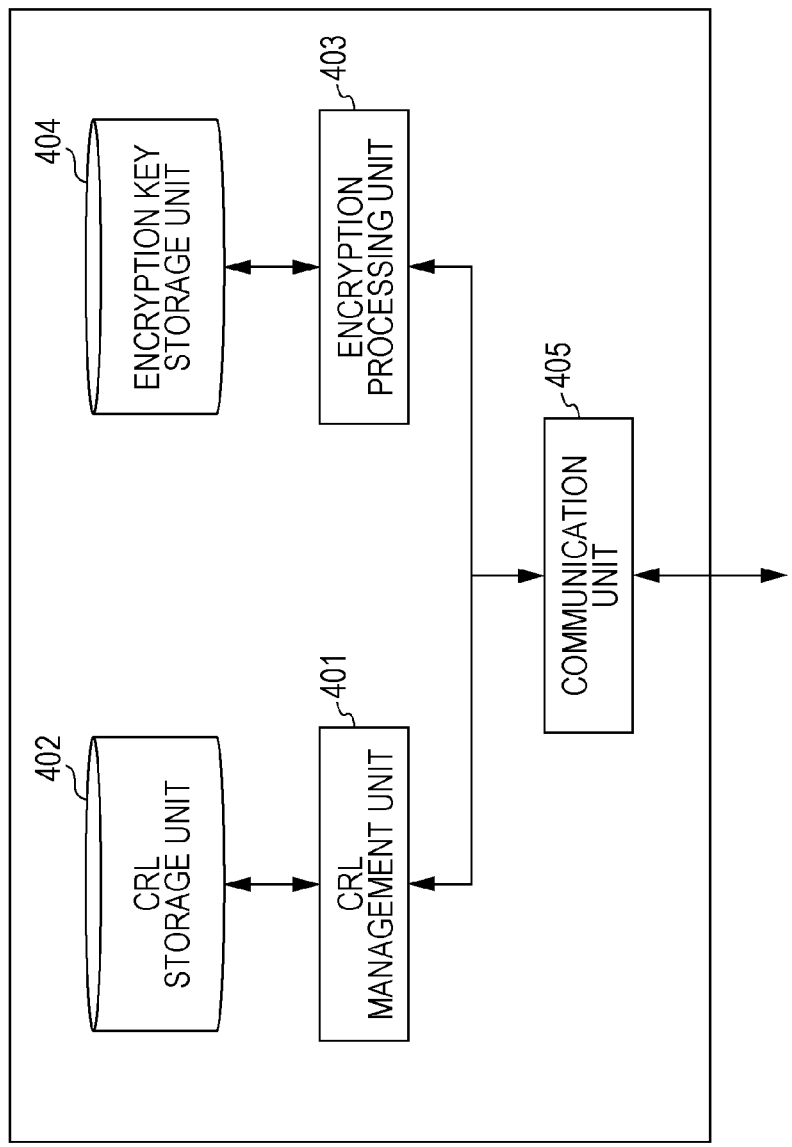
FIG. 10 is a diagram illustrating a configuration of a portal server according to the first embodiment.

FIG. 10 is a diagram illustrating a configuration of the portal server 400. The portal server 400 includes a CRL management unit 401, a CRL storage unit 402, an encryption processing unit 403, an encryption key storage unit 404, and a communication unit 405.

The CRL management unit 401 controls the CRL storage unit 402 to manage the CRL. When the CRL management unit 401 receives a request to issue a CRL from a maker server, a service server, or the like, the CRL management unit 401 sets data other than a signature of the CRL and requests the encryption processing unit 403 to generate the signature. The CRL management unit 401 receives the CRL with the generated signature from the encryption processing unit 403, and records the CRL in the CRL storage unit 402.

The CRL storage unit 402 records the issued CRL.

When the encryption processing unit 403 receives the request to generate the signature from the CRL management unit 401, the encryption processing unit 403 generates the signature of the CRL using a secret key stored in the encryption key storage unit 404. After generating the signature of the CRL, the encryption processing unit 403 transmits the signature to the CRL management unit 401.

The encryption key storage unit 404 stores the secret key for use in issuing the CRL of the portal server of the certificate authority.

The communication unit 405 communicates with each of servers 300a to 300c. In the communication with each of the servers 300a to 300c, SSL communication is performed. A certificate necessary in the SSL communication is recorded by the communication unit 405.

1.6 Operation of Authentication System 10

The operation of authentication system 10 includes the following.

(1) Device registration process in which a device connects to a controller and the device is registered in a server.
(2) Process of updating a CRL of a maker server.
(3) Process of updating a CRL of a device.

Each process is described below with reference to figures.

1.6.1 Operation of in device registration process

Figure 11:
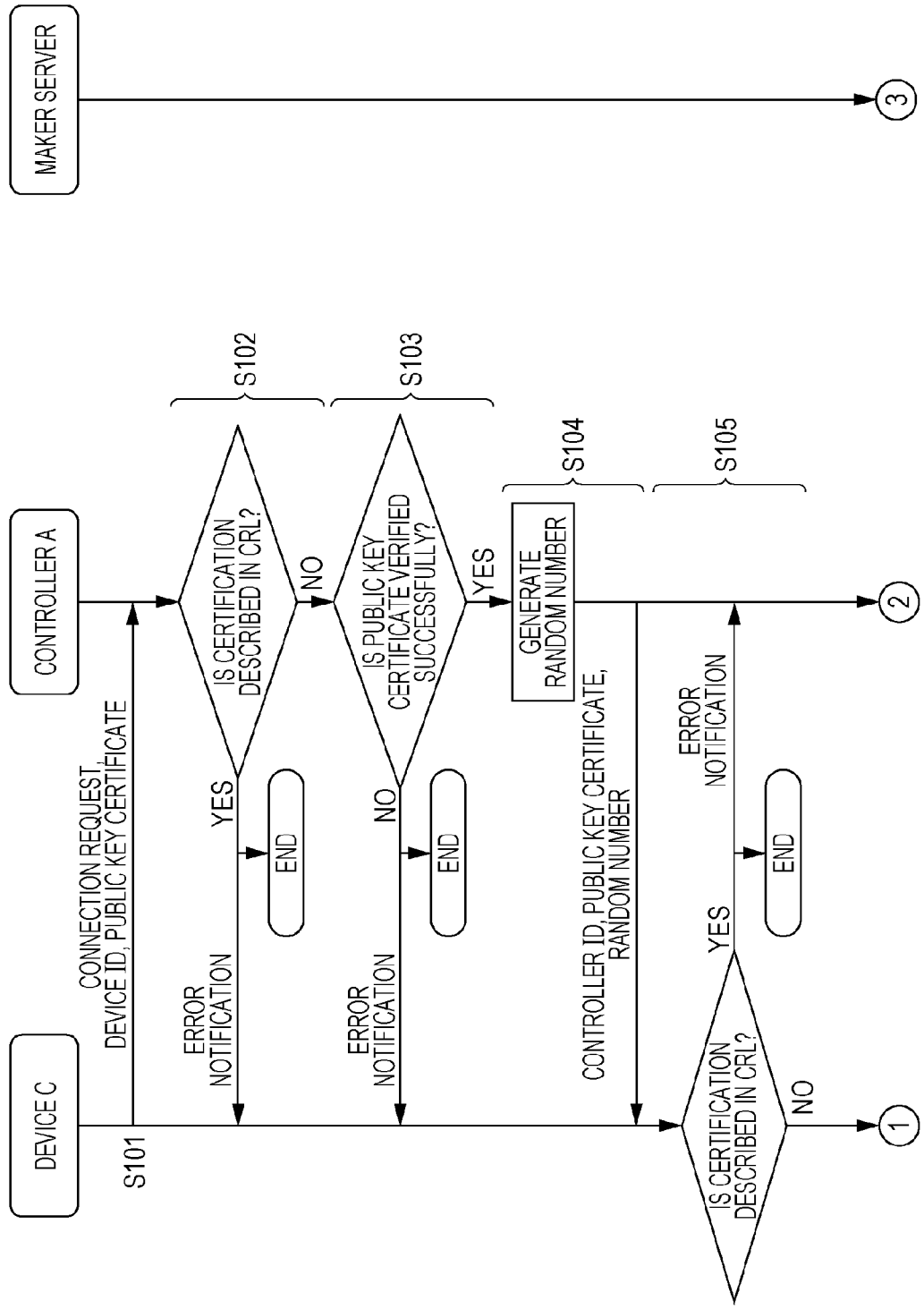
FIG. 11 is a diagram illustrating a sequence of processes of registering a device according to the first embodiment.
Figure 12:
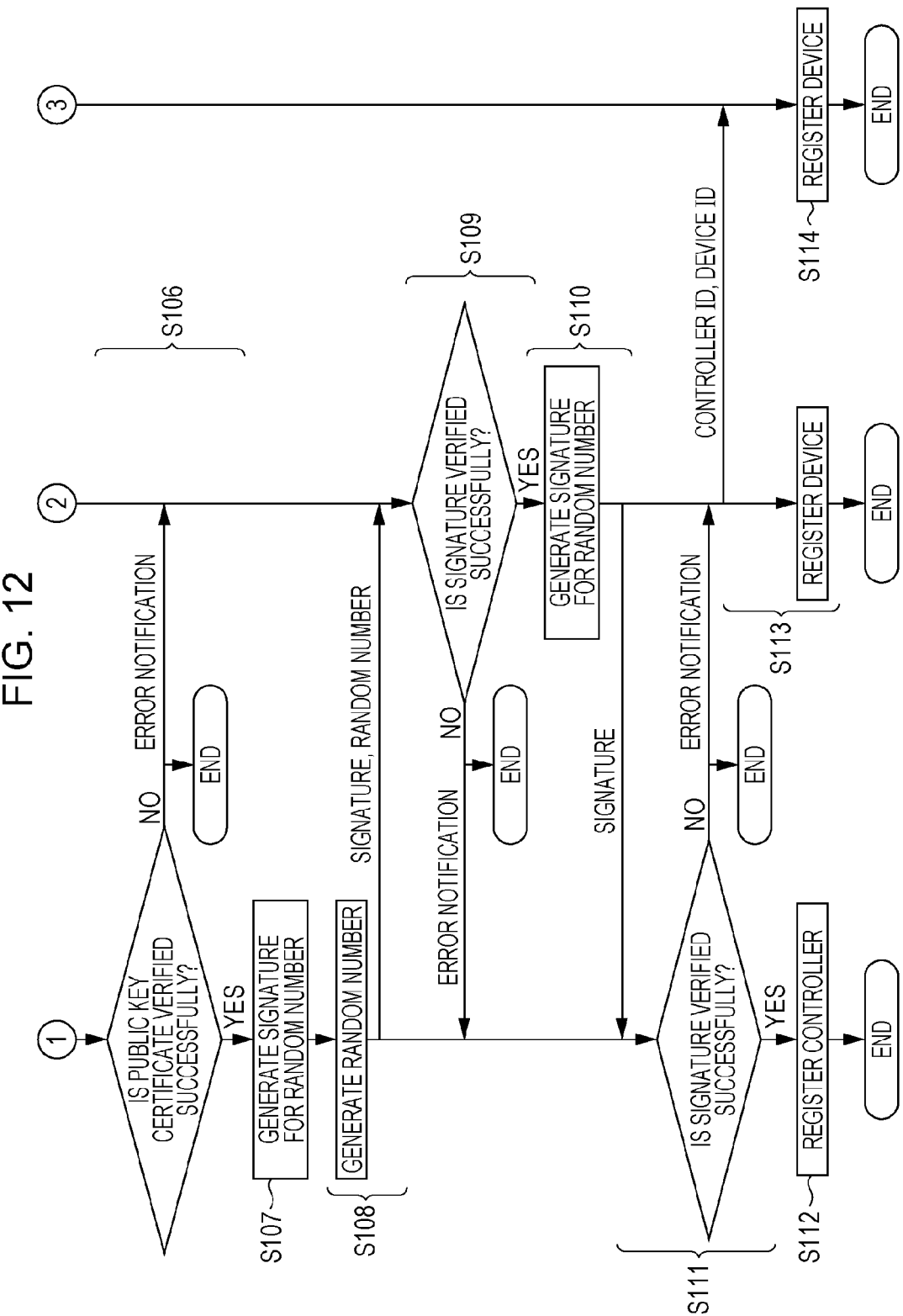
FIG. 12 is a diagram illustrating a sequence of processes of registering a device according to the first embodiment.

FIG. 11 to FIG. 12 illustrate a sequence of processes in which the device C is connected to the controller A and registered in the maker server. A process is similar when the device A or the device B is connected to the controller A and registered in the maker server or when the device C is connected to the controller B and is registered in the service server A.

(S101) The device C sends a connection request to the controller A. Together with this request, a device ID of the device C and a public key certificate thereof are also transmitted.

(S102) The controller A checks whether a certificate ID of the public key certificate of the device C from which the connection request is received is described in the CRL stored in the authentication information storage unit. In a case where the certificate is found in the CRL, an error is notified to the device C and the process is ended.

(S103) The controller A verifies a signature of the public key certificate received from the device C. In a case where the verification is not successful, an error is notified to the device C, and the process is ended. The signature used here may be a signature written using ECDSA (Elliptic Curve Digital Signature Algorithm). A description of ECDSA may be found, for example, in National Security Agency, "Suite B Implementer's Guide to FIPS 186-3 (ECDSA)" (uploaded Feb. 3, 2010 at URL: http://www.nsa.gov/ia/_files/ecdsa.pdf (searched Jun. 24, 2014), and thus a description thereof is omitted here.

(S104) The controller A generates a random number and transmits it together with a controller ID and the public key certificate to the device C.

(S105) The device C checks whether a certificate ID of the public key certificate of the controller A from which the connection request was transmitted is described in a stored CRL. In a case where the certificate is found in the CRL, an error is notified to the controller A, and the process is ended.

(S106) The device C verifies a signature of the public key certificate received from the controller A. In a case where the verification fails, an error is notified to the controller A, and the process is ended.

(S107) The device C generates a signature from the random number received from the controller A and a secret key of the device C.

(S108) The device C generates a random number and transmits it together with the signature generated in S107 to the controller A.

(S109) The controller A receives the signature and the random number and verifies the signature using the public key certificate received in S101. In a case where the verification of the signature is not successful, an error is notified to the device C and the process is ended.

(S110) The controller A generates a signature from the random number received in S109 and a secret key of the controller A, and transmits the signature to the device C.

(S111) The device C receives the signature and verifies the signature using the public key certificate received in S104. In a case where the verification of the signature is not successful, an error is notified to the controller A, and the process is ended.

(S112) In a case where the verification in S111 is successful, the device C registers the controller in the connected controller management table.

(S113) The controller A transmits, to the maker server, the controller ID and the certificate ID, and the device ID and the certificate ID of the device verified as being valid in S109, and the controller A registers the device ID of the device and the certificate ID thereof in the connected device management table.

(S114) When the maker server receives, from the controller A, the controller ID of the controller A and the certificate ID thereof and the device ID of the device C and the certificate ID, the maker server registers them in the device information management table.

1.6.2 Operation of Updating a CRL of a Maker Server

Figure 13:
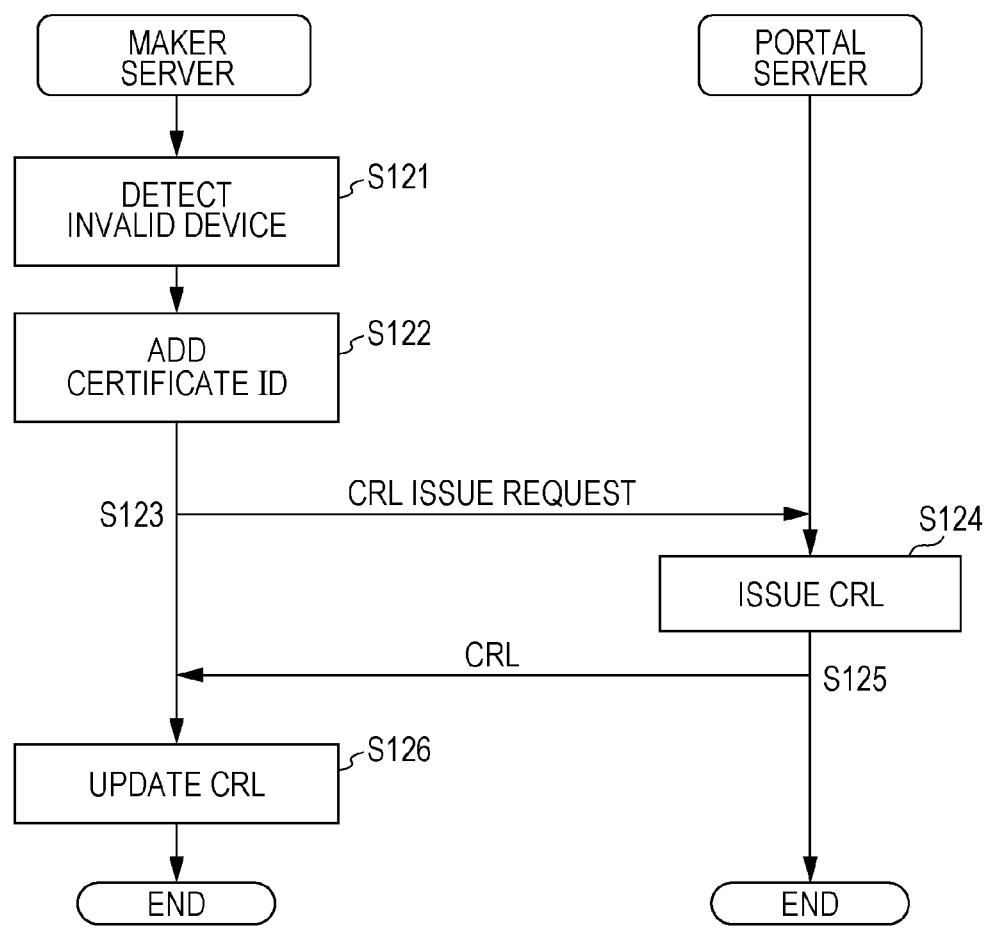
FIG. 13 is a diagram illustrating a sequence of processes of updating a CRL of a maker server according to the first embodiment.

FIG. 13 illustrates a sequence of updating a CRL of a maker server.

(S121) The maker server detects an invalid device. In a specific example, the maker server detects a situation in which a plurality of controllers having the same certificate ID are connected to the maker server. In another specific example, the maker server detects a situation in which a plurality of devices having the same certificate ID are registered in the maker server. Furthermore, also in a case where leakage of a secret key is detected, a device or a controller having a corresponding public key certificate is regarded as an invalid device.

(S122) The maker server rewrites the CRL such that a certificate ID of the invalid device or the invalid controller detected in S201 is added to the certificate IDs described in the CRL.

(S123) The maker server transmits a CRL issue request together with all certificate IDs of invalid devices and invalid controllers to the portal server of the certificate authority.

(S124) The portal server issues a CRL based on the received certificate IDs.

(S125) The portal server transmits the CRL to the maker server.

(S126) The maker server records the received CRL in the CRL storage unit thereby updating it into the latest CRL.

Although the process is described above, by way of example, for a case where the CRL of the maker server is updated, a process is similar when a CRL of a service server or a content server is updated. Note that even when no invalid device is detected in S121, the maker server updates the CRL before a next issue date.

1.6.3 Operation of Updating a CRL of a Device

Figure 14:
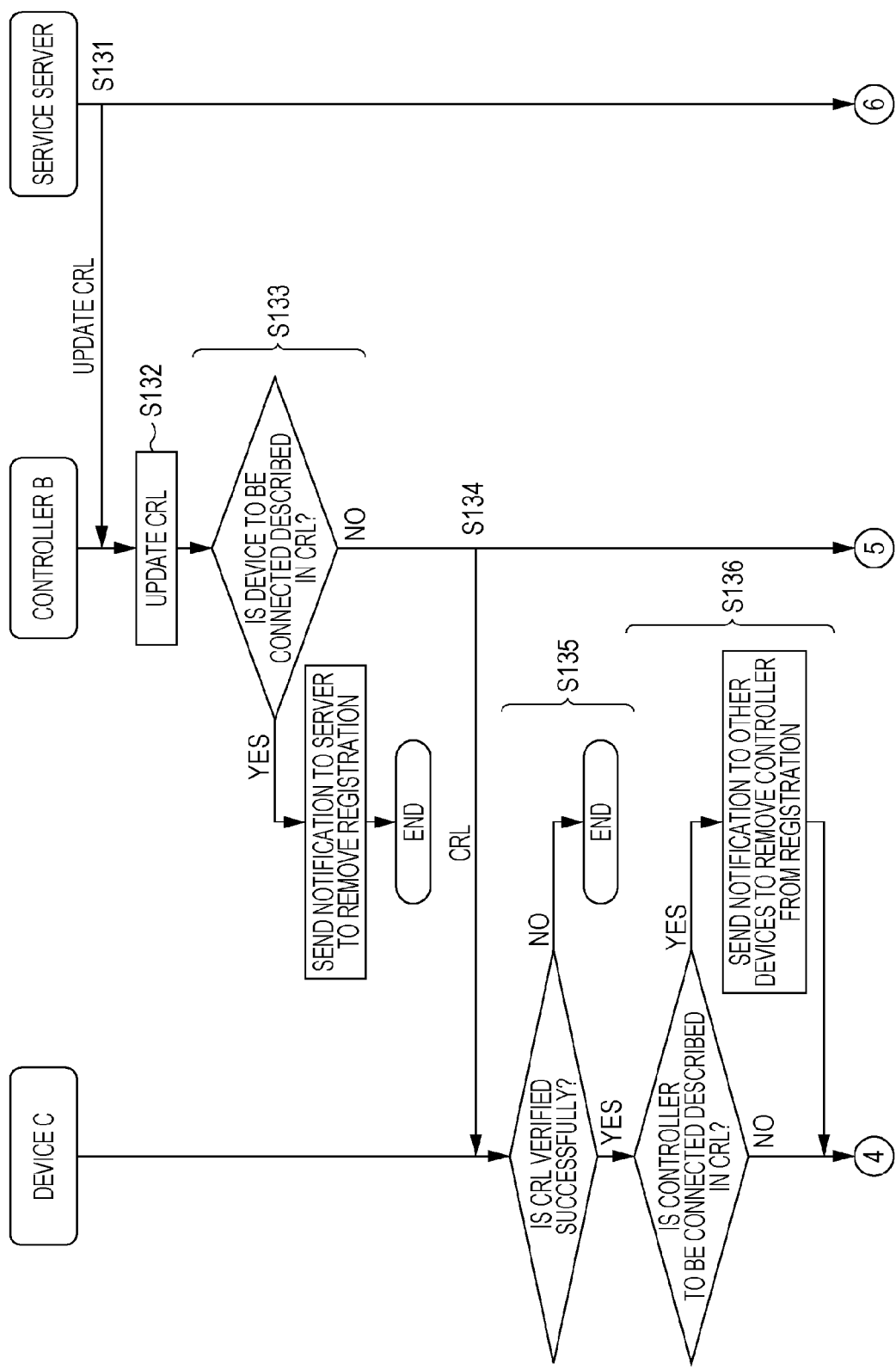
FIG. 14 is a diagram illustrating a sequence of processes of updating a CRL of a device according to the first embodiment.
Figure 15:
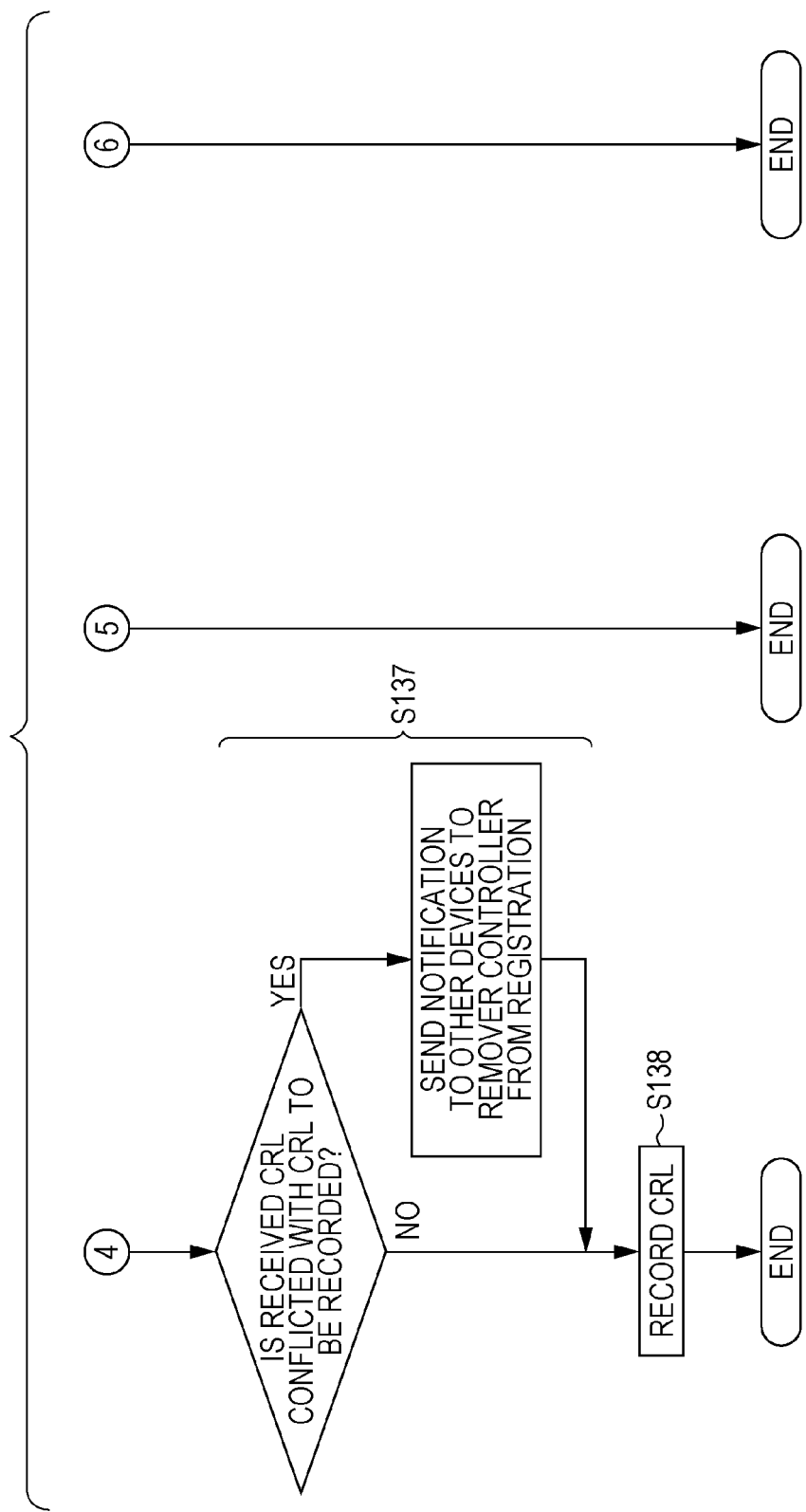
FIG. 15 is a diagram illustrating a sequence of processes of updating a CRL of a device according to the first embodiment.

FIG. 14 to FIG. 15 illustrate a sequence of updating the CRL of the device C from the controller B. Although the process is explained, by way of example, for a case where the CRL of the device C is updated from the controller B, a process is similar for a case where the CRL of the device C is updated from the controller A.

(S131) After the service server updates the CRL, the service server sends a CRL update request together with the CRL to the controller B.

(S132) The controller B updates the CRL to that received from the service server.

(S133) The controller B checks whether the device to be connected is described in the CRL. In a case where the device is found in the CRL, the controller B notifies the service server of this fact and removes the registration of the device.

(S134) The controller B sends a CRL update request together with the CRL to all devices to be connected. In the following description, by way of example, it is assumed that the update request is given to the device C.

(S135) The device C verifies a signature of the received CRL. In a case where the verification is not successful, the process of updating the CRL is ended.

(S136) The device C checks whether any controller to be connected is described in the CRL. In a case where even one of the controllers to be connected is described in the CRL, the device C notifies other devices and controllers of the detection of an invalid controller. Furthermore, the device C removes the registration of the invalid controller from the connected controller management table.

(S137) The device C compares the CRL received from the controller B and the CRL in the authentication information storage unit and checks whether there is a contradiction. More specifically, in a case where the CRL received from the controller A is recorded, the date of issuing the CRL received from the controller B is compared with the next issue date of the CRL that has been received from the controller A. In a case where the next issue date of the CRL that has been received from the controller A is earlier than the issue date of the CRL received from the controller B, it is determined that the next issue date of the CRL that has been received from the controller A has expired, and it is further determined that the controller A has not updated the CRL and thus the controller A is detected as an invalid controller. Furthermore, the versions of the CRLs received from the controller A and the controller B are compared. In a case where the versions of the CRL are not equal, it is determined that a controller that transmitted a CRL with an older version has not updated the CRL, and thus this controller is detected as an invalid controller. In this case, the device C notifies other devices and controllers of the detection of the invalid controller. Furthermore, the device C removes the registration of the invalid controller from the connected controller management table. Furthermore, the device C disconnects the controller A.

Figure 16:
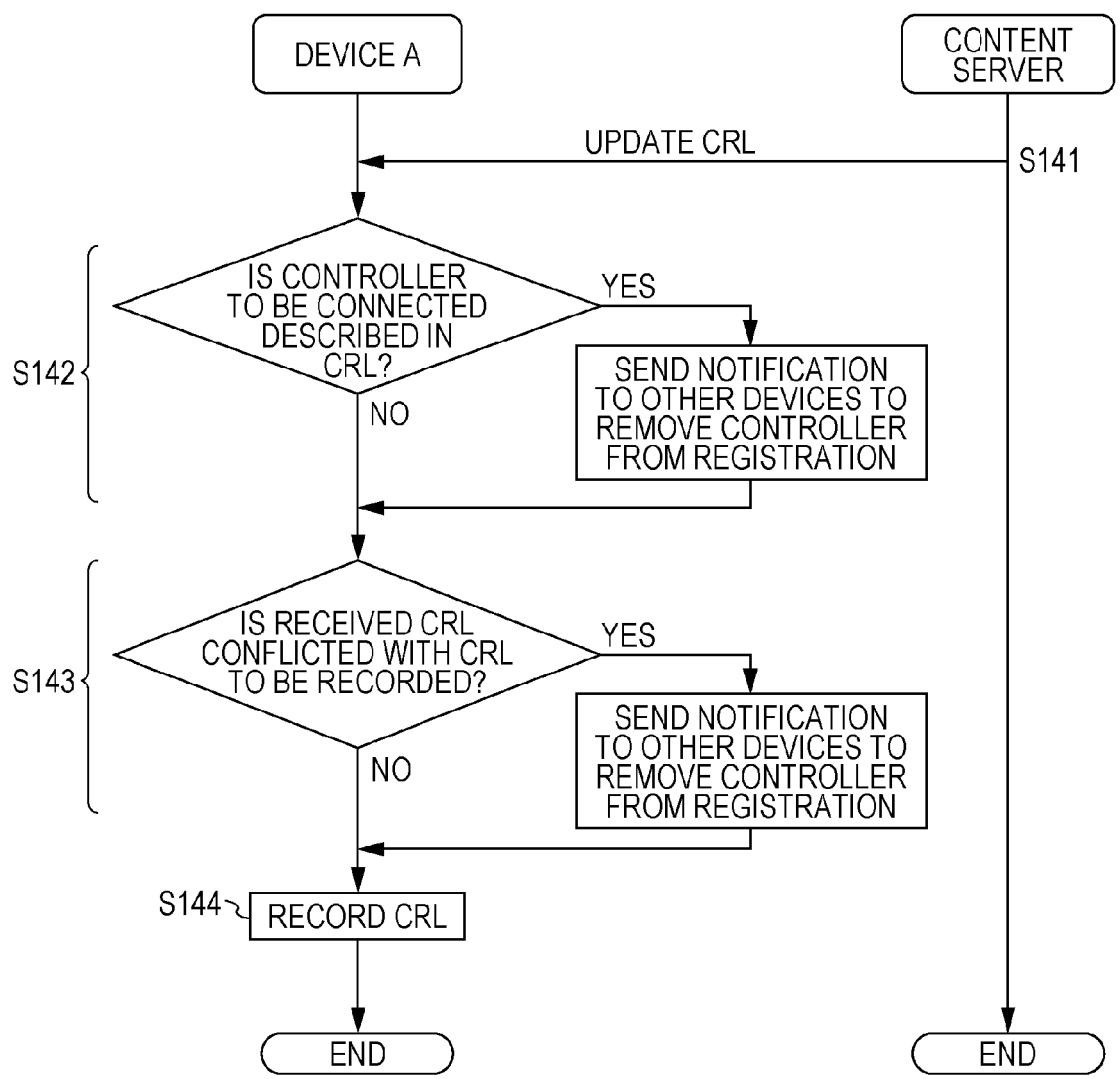
FIG. 16 is a diagram illustrating a sequence of processes of updating a CRL of a device according to the first embodiment.

(S138) The device C records the received CRL in the authentication information storage unit. FIG. 16 illustrate a sequence of updating the CRL of the device C from a content server.

(S141) After the content server updates the CRL, the content server sends a CRL update request together with the CRL to the device A.

(S142) The device C checks whether any controller to be connected is described in the CRL. In a case where even one of the controllers to be connected is found to be described in the CRL, the device C notifies other devices, controllers, and content servers of the detection of an invalid controller. Furthermore, the device C removes the registration of the invalid controller from the connected controller management table.

(S143) The process of S143 is similar to that in S137 and thus a description thereof is omitted.

(S144) The process of S144 is similar to that in S138 and thus a description thereof is omitted.

1.7 Advantageous Effects of First Embodiment

In a case in which a device is connected to only one controller, if the controller is an invalid controller, it is impossible for the device to update the CRL. In the first embodiment, a device receives a CRL from a plurality of controllers. Thus, in the authentication system according to the first embodiment, the device is allowed to receive a CRL via a plurality of networks and is allowed to update the CRL. By making it possible of updating the CRL, it becomes possible to prevent a connection to an invalid controller, and it becomes possible to achieve a secure connection between a device and a valid controller.

Second Embodiment

2. System Configuration

An authentication system 11 according to an embodiment of the present disclosure is described below referring to figures.

In the authentication system 11 according to a second embodiment, after authentication is made between a controller and a device, an encryption key for communication is shared and history information of the device is transmitted to a server via encrypted communication.

2.1 Overall Configuration of Authentication System 11

The overall configuration of the authentication system 11 according to the second embodiment is similar to that according to the first embodiment and thus a description thereof is omitted here. Constituent elements having similar functions to those in the first embodiment are denoted by similar symbols and a description thereof is omitted.

2.2 Operation of Authentication System 11

The operation of the authentication system 11 includes the following.

(1) Device registration process in which a device connects to a controller and the device is registered in a server.
(2) Process of updating a CRL of a maker server.
(3) Process of updating a CRL of a device.
(4) Process of transmitting device history information from a device to a server.

Processes of (2) and (3) are similar to those according to the first embodiment, and thus a description thereof is omitted here.

Each process is described below with reference to figures.

2.2.1 Operation of in Device Registration Process

Figure 17:
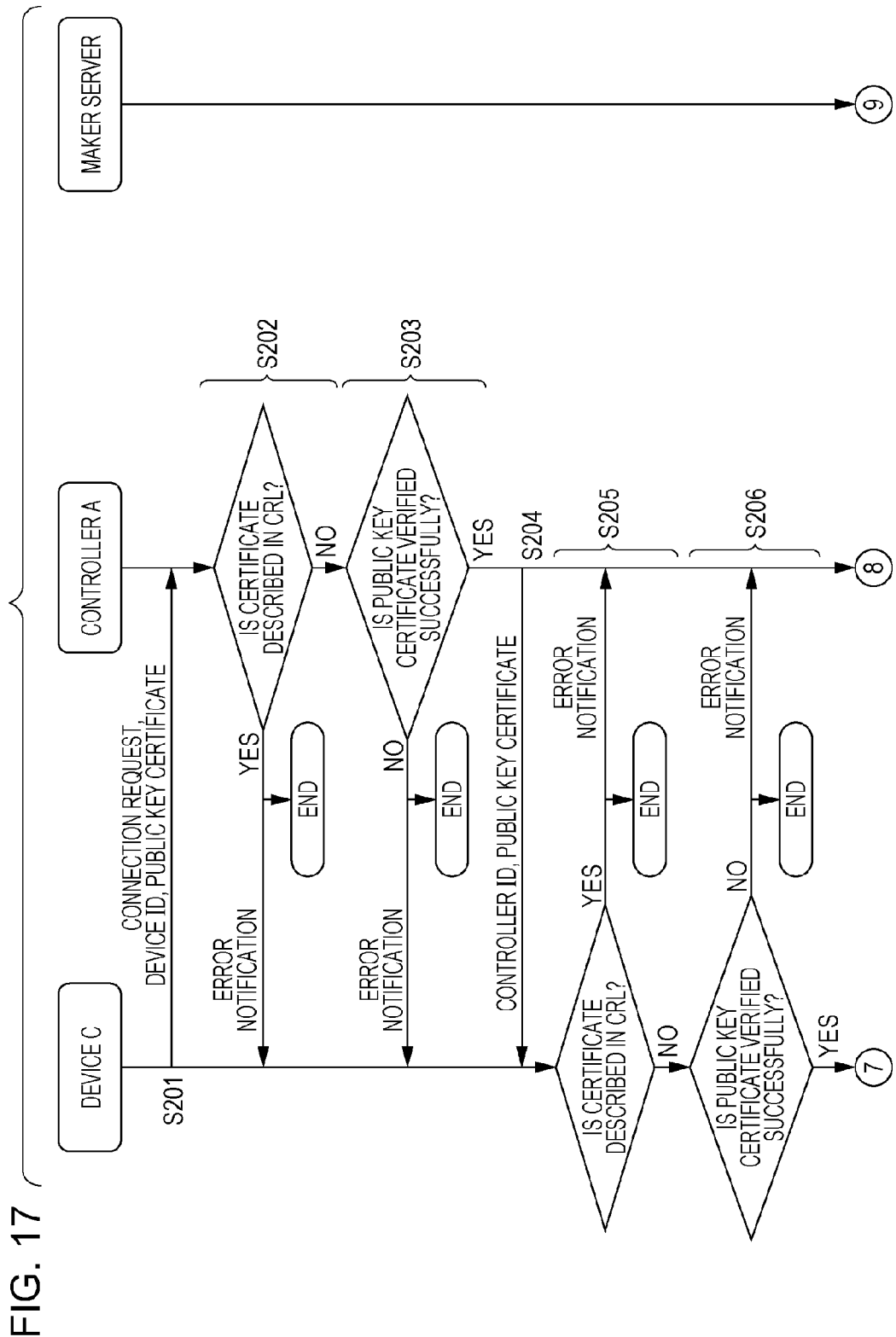
FIG. 17 is a diagram illustrating a sequence of processes of registering a device according to a second embodiment.
Figure 18:
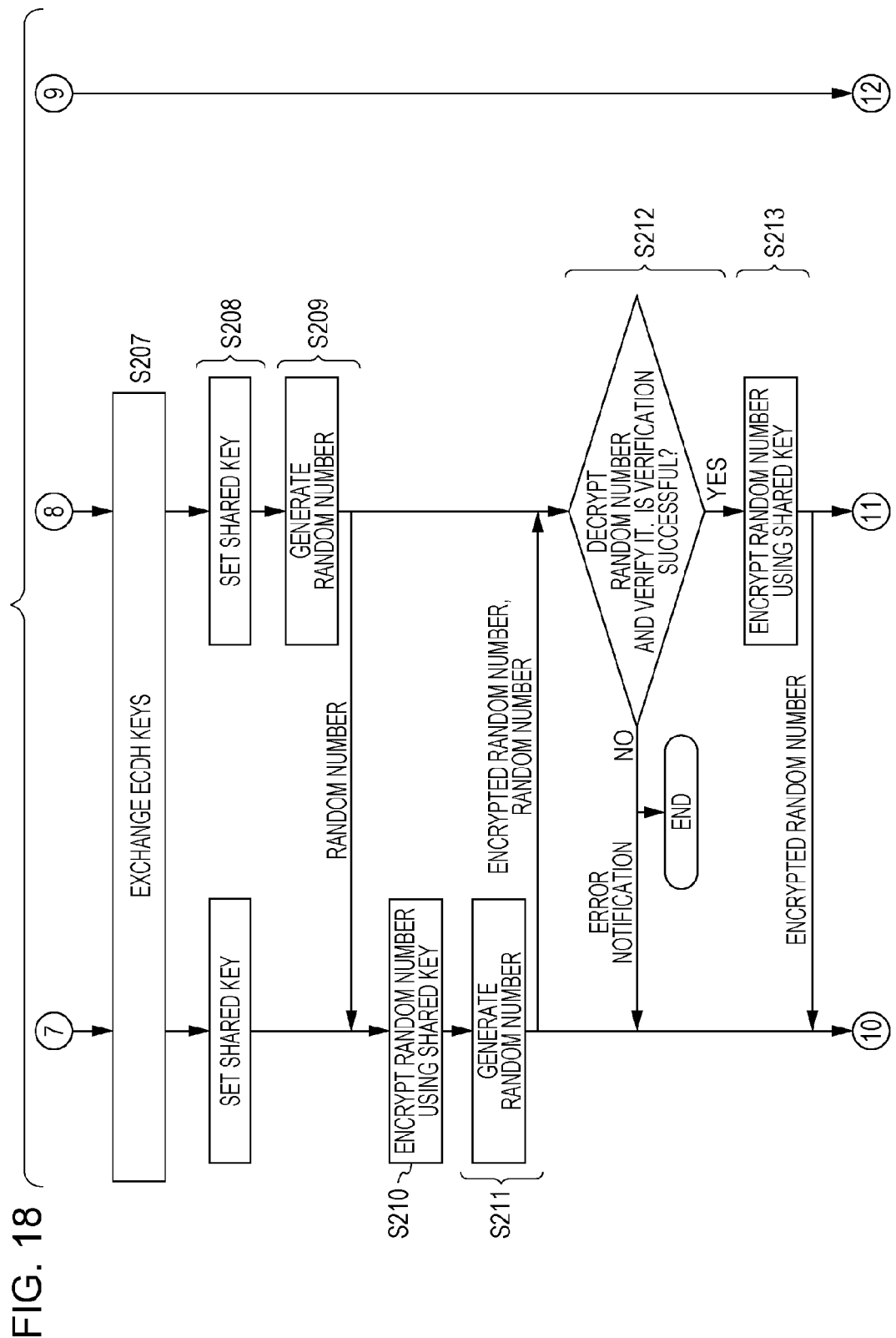
FIG. 18 is a diagram illustrating a sequence of processes of registering a device according to a second embodiment.
Figure 19:
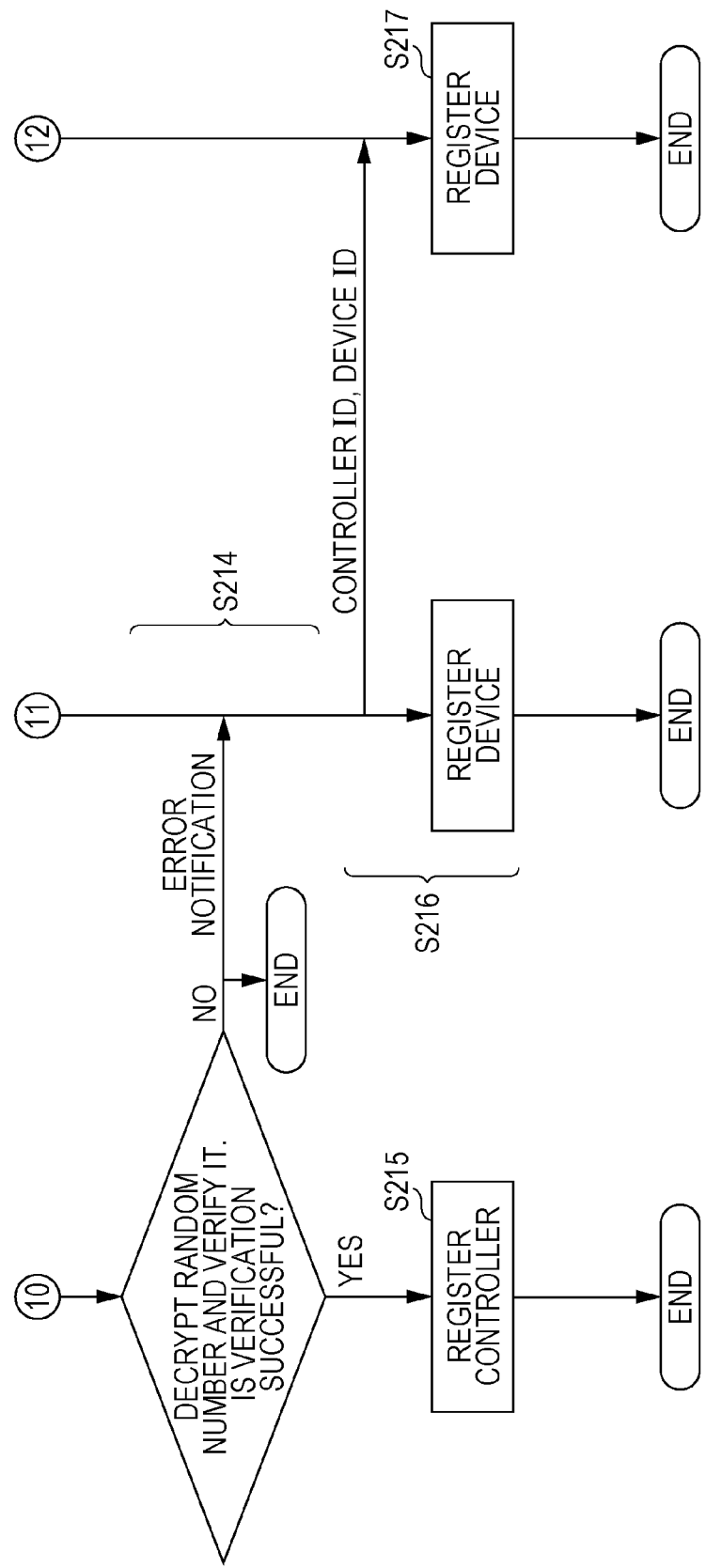
FIG. 19 is a diagram illustrating a sequence of processes of registering a device according to a second embodiment.

FIG. 17 to FIG. 19 illustrate a sequence of processes in which the device C is connected to the controller A and is registered in the maker server. A process is similar when the device A or the device B is connected to the controller A and registered in the maker server or when the device C is connected to the controller B and is registered in the service server A.

Processes from (S201) to (S203) are similar to the processes from S101 to S103 according to the first embodiment, and thus a further description thereof is omitted.

(S204) The controller A transmits a controller ID and a public key certificate to the device C. Processes from (S205) to (S206) are similar to the processes from S105 to S106, and thus a further description thereof is omitted.

(S207) The device C and the controller A exchange keys. In this process, an ECDH (Elliptic Curve Diffie-Hellman) key exchange algorithm using elliptic curve cryptography is employed. ECDH is described in Elaine Barker, et al., NIST Special Publication 800-56A Revision 2, "Recommendation for Pair-Wise Key-Establishment Schemes Using Discrete Logarithm Cryptography" (uploaded May 13, 2013 at URL: http://nvlpubs.nist.gov/nistpubs/SpecialPublications/ NIST.SP.800-56Ar2.pdf by National Institute of Standards and Technology, searched Jun. 24, 2014), and thus a description thereof is omitted here.

(S208) In the device C and the controller A, the key shared via the key exchange is set as a shared key.

(S209) The controller A generates a random number and transmits it to the device C.

(S210) The device C receives the random number from the controller A and encrypts it with the shared key.

(S211) The device C generates a random number and transmits it together with the encrypted random number generated in S211 to the controller A.

(S212) The controller A receives the encrypted random number and the random number. The controller A decrypts the encrypted random number using the shared key and verifies whether the decrypted random number is identical to the random number generated in S210. In a case where the verification is not successful, an error is notified to the device C, and the process is ended.

(S213) In a case where the verification in S212 successful, the controller A encrypts the random number received in S212 using the shared key and transmits the encrypted random number to the device C.

(S214) The controller C receives the encrypted random number. The controller C decrypts the encrypted random number using the shared key and verifies whether the decrypted random number is identical to the random number generated in S211. In a case where the verification is not successful, an error is notified to the controller A, and the process is ended.

(S215) In a case where the verification in S214 is successful, the device C registers the controller A in the connected controller management table. FIG. 20 illustrates a connected controller management table according to the second embodiment. This connected controller management table further includes a shared key shared by a controller in addition to items in the connected controller management table according to the first embodiment.

(S216) The controller A transmits a controller ID and a certificate ID and a device ID and a certificate ID of the device that has passed the verification in S212 to the maker server, and registers the device ID and the certificate ID of the device in the connected device management table. FIG. 21 illustrates a connected device management table according to the second embodiment. This connected device management table further includes a shared key shared by a device in addition to items in the connected device management table according to the first embodiment.

(S217) is similar to the process in S114 according to the first embodiment, and thus a further description thereof is omitted.

2.2.2 Operation of Transmitting Device History Information From a Device to a Maker Server FIG. 22 illustrates a sequence of transmitting device history information from a device to a maker server. Note that this uploading is performed periodically or non-periodically.

(S221) The device encrypts accumulated device history information with the shared key and transmits it together with the device ID to the controller.

(S222) The controller receives the device ID and the encrypted device history information. The controller retrieves a shared key based on the device ID and decrypts the device history information using the shared key.

(S223) The controller and the maker server perform SSL authentication and establish an encrypted communication path.

(S224) The controller transmits the ID of the controller, the device ID received from the device, and the device history information to the maker server.

(S225) The maker server registers the ID of the controller, the device ID, and the device history information, received.

2.3 Advantageous Effects of Second Embodiment

In the second embodiment, when authentication of a device is performed, a key is exchanged, and challenge and response authentication is performed using a shared key. The shared key can only be generated from a secret key and a corresponding public key, and thus if the secret key corresponding to the public key of the public key certificate is not possessed, it is impossible to generate the shared key, and thus the challenge and response authentication cannot be successful. This makes it possible to simplify the authentication process compared with an authentication process in which a signature is generated using a secret key and the signature is verified using a public key. Furthermore, it also becomes possible to transmit history information of the device by encrypted communication using the common key, which makes it possible to prevent the history information of the device from being leaked.

3. Modifications

Although the present disclosure has been described above with reference to embodiments, the present disclosure is not, as a matter of course, limited to the embodiments described above. The present disclosure also includes in its scope the following.

(1) In the embodiments described above, a controller may acquire a CRL from a server when a device registration process is performed. In addition to acquisition in the device registration process, acquisition may be performed periodically. The CRL may acquired by the server before the next issue date of the CRL.

(2) In the embodiments described above, to acquire a CRL, a device communicates with a server via a controller, or the device communicates with a content server. Alternatively, the CRL may be acquired via a portable terminal connected to the server. Communication between the portable terminal and the device may be performed by NFC (Near field communication) communication or Bluetooth (registered trademark) communication.

(3) In the embodiments described above, in a case where a device determines that a controller is invalid, this fact is notified to other devices or controllers. In this situation, when a device or a controller that receives the notification has a displaying function, information may be displayed on a display screen to indicate that the invalid controller has been detected. In a case where there is no display screen, an error code may be displayed or a lamp may be turned on in a blinking manner.

This makes it possible for a user having the invalid controller to see the indication and exchange the invalid controller.

(4) In the second embodiment described above, the challenge and response authentication using a common key is performed. However, the authentication is not limited to the challenge and response authentication. An authentication method described in RFC5191 may be used, and furthermore EAP-PSK may be used.

(5) In the first embodiment described above, when the device registration process is performed, a key for encrypted communication may be exchanged. As a key exchange method, DH (Diffie-Hellman) or ECDH may be used.

(6) In the embodiments described above, a controller may display electric power consumed by a connected device, electric power supplied from a battery, or electric power generated by a solar battery system.

(7) In the embodiments described above, a controller may be a power distribution board installed in a home.

(8) In the embodiments described above, communication between a controller and a device may be realized by Wi-Fi communication, a specified low power radio communication, power line communication, or Bluetooth (registered trademark) communication.

(9) In the embodiments described above, a portal server functioning as a certificate authority issues a CRL. However, the certificate authority is not limited to the portal server, but another server such as a maker server, a service server, or a content server may function as a certificate authority and may issue a CRL.

(10) In the embodiments described above, a CRL issued includes, by way of example but not limitation, all invalid certificate IDs, but the CRL issued may be a CRL including only a device produced by a maker server, or the CRL may be a CRL including a device or a controller related to service provided by a service server, or alternatively, the CRL issued may be a CRL including only a device connectable to a content server. A CRL may be issued separately for each device type produced by a maker server or separately for each manufacturing year.

(11) A specific example of each apparatus described above is a computer system including a microprocessor, a ROM, a RAM, a hard disk unit, a display unit, a keyboard, a mouse, and the like. A computer program may be stored in the RAM or the hard disk unit. In each apparatus, the microprocessor may operate according to the computer program thereby achieving the function of the apparatus. The computer program may be a combination of a plurality of instruction codes indicating instructions that are given to the computer to achieve a particular function.

(12) Part or all of the constituent elements of each apparatus described above may be implemented in a single system LSI (Large Scale Integration). The system LSI may be a super-multifunction LSI produced such that a plurality of parts are integrated on a single chip. More specifically, the system LSI may be a computer system including a microprocessor, a ROM, a RAM, and so on. A computer program may be stored in the RAM. In the system LSI, the microprocessor may operate according to the computer program thereby achieving the function of the system LSI.

Each of the constituent elements of each apparatus described above may be integrated separately on a single chip, or part of all of the apparatus may be integrated on a single chip.

Although in the above description, the term system LSI is used, it is also called an IC, an LSI, a super LSI, or an ultra LSI depending on the integration density. The method of implementing the integration circuit is not limited to the LSI, but the integrated circuit may be implemented in the form of a dedicated circuit or a general-purpose processor. Alternatively, the LSI may be implemented in the form of an FPGA (Field Programmable Gate Array) that allows programming to be performed after the LSI is produced, or the LSI may be implemented in the form of a reconfigurable processor that allows it to reconfigure interconnections among circuit cells in the LSI or reconfigure setting.

As a matter of course, if a progress of a semiconductor technology or another technology derived therefrom provides a new technology for realizing an integrated circuit which can replace the LSI, functional blocks may be integrated using the new technology. Use of biotechnology is potentially possible.

(13) Part or all of the constituent elements of each apparatus described above may be implemented in the form of an IC card attachable to the apparatus or in the form of a single module. The IC card or the module may be a computer system including a microprocessor, a ROM, a RAM, and so on. The IC card or the module may include the super-multifunction LSI described above. In the IC card or the module, the microprocessor may operate according to the computer program thereby achieving the function of the IC card or the module. The IC card or the module may be configured so as to be resistant against tampering.

(14) The present disclosure may be implemented as a method. The method may be realized by a computer program that is to be executed by a computer or the method may be realized by a digital signal associated with the computer program.

The present disclosure may be implemented by a computer readable storage medium, such as a flexible disk, a hard disk, a CD-ROM, a MO disk, a DAD disk, a DVD-ROM disk, a DVD-RAM disk, a BD (Blu-ray Disc), a semiconductor memory, or the like in which the computer program or the digital signal are stored. Alternatively, the digital signal may be recorded in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and the storage medium may be transported, or the program or the digital signal may be transferred via the network or the like thereby allowing the present disclosure to be implemented in another computer system.

(15) The details of the above-described embodiments and the modifications may be combined.

According to the present disclosure, in a system in which a device is connected to a controller, a CRL is acquired via a plurality of networks thereby making it possible to detect an invalid controller even when the device is connected to the invalid controller.

What is claimed is:

1. An authentication method, in a household device authentication system including a first controller connected to a first server via a first network, a second controller connected to a second server via a second network, and a device connected to the first controller and the second controller, the authentication method performing authentication between the device and the first controller or between the device and the second controller, the authentication method comprising:

acquiring, by the device and via one of a plurality of networks, a first certificate revocation list from the first controller, the first certificate revocation list including first time information indicating a next issue date of the first certificate revocation list;

acquiring, by the device and via an other of the plurality of networks, a second certificate revocation list from the second controller, the second certificate revocation list including second time information indicating an issue date of the second certificate revocation list;

comparing, by the device, the first time information and the second time information to determining whether the first controller is invalid; and one of disconnecting and disabling, by the device, a connection with the first controller in response to a determination that the first controller is invalid based on the comparing of the first time information and the second time information, wherein the first certificate revocation list and the second certificate revocation list are each associated with a certificate of the first controller, a certificate of the second controller, and a certificate of the device, and the first certificate revocation list is acquired from the first controller before the second certificate revocation list is acquired from the second controller.

2. The authentication method according to claim 1, wherein, in the comparing, in a case where the first time information is earlier than the second time information, it is determined that the first controller is invalid.

3. The authentication method according to claim 1, wherein, in the comparing, in a case where it is determined that the first controller is invalid, a notification is sent to the second controller to notify that the first controller is invalid.

4. The authentication method according to claim 1, wherein one of the first server and the second server is a content server that provides a content.

5. The authentication method according to claim 4, wherein an other one of the first server and the second server is a service server of an electric power company.

6. An authentication system of performing household device authentication, the authentication system comprising:
a first controller connected to a first server via a first network;
a second controller connected to a second server via a second network; and
a device connected to the first controller and the second controller, the authentication system performing authentication between the device and the first controller or between the device and the second controller,
wherein the device includes a processor and a memory, the memory including a program that, when executed by the processor, causes the processor to perform operations including:

acquiring, via one of a plurality of networks, a first certificate revocation list from the first controller, the first certificate revocation list including first time information indicating a next issue date of the first certificate revocation list;

acquiring, via an other of the plurality of networks, a second certificate revocation list from the second controller, the second certificate revocation list including second time information indicating an issue date of the second certificate revocation list;

comparing the first time information and the second time information to determine whether the first controller is invalid; and one of disconnecting and disabling a connection with the first controller in response to a determination that the first controller is invalid based on the comparing of the first time information and the second time information, the first certificate revocation list and the second certificate revocation list are each associated with a certificate of the first controller, a certificate of the second controller, and a certificate of the device, and the first certificate revocation list is acquired from the first controller before the second certificate revocation list is acquired from the second controller.

7. A device in a household device authentication system, the household device authentication system including a first controller connected to a first server via a first network and a second controller connected to a second server via a second network, the device performing authentication of the first controller and the second controller, the device comprising:

a network interface configured to acquire, via one of a plurality of networks, a first certificate revocation list from the first controller, the first certificate revocation list including first time information indicating a next issue date of the first certificate revocation list;

the network interface configured to acquire, via an other of the plurality of networks, a second certificate revocation list from the second controller, the second certificate revocation list including second time information indicating an issue date of the second certificate revocation list;

a processor, including circuitry, configured to compare the first time information and the second time information to determining whether the first controller is invalid; and the processor configured to one of disconnect and disable a connection with the first controller in response to a determination that the first controller is invalid based on a comparison of the first time information and the second time information, wherein the first certificate revocation list and the second certificate revocation list are each associated with a certificate of the first controller, a certificate of the second controller, and a certificate of the device, and the network interface is configured to acquire the first certificate revocation list from the first controller before acquiring the second certificate revocation list from the second controller.

8. The authentication method according to claim 1, wherein, in the comparing, the first controller is determined to be invalid when the next issue date indicated by the first time information is earlier than the issue date indicated by the second time information.

9. The authentication method according to claim 8, wherein, when the next issue date indicated by the first time information is earlier than the issue date indicated by the second time information, the device determines that the first controller has not updated the first certificate revocation list and that the first controller is an invalid controller.

10. The authentication method according to claim 9, wherein the device is configured to receive a third certificate revocation list from the first controller after an acquisition of the first certificate revocation list and before an acquisition of the second certificate revocation list, the third certificate revocation list configured to update the first certificate revocation list and not contradict with the second certificate revocation list.

11. The authentication method according to claim 1, wherein the first time information of the first certificate revocation list further includes an issue date of the first certificate revocation list.

* * * * *